Patented Feb. 24, 1931

1,793,686

UNITED STATES PATENT OFFICE

FOREST J. FUNK, OF WILMINGTON, DELAWARE, ASSIGNOR TO E. I. DU PONT DE NEMOURS & COMPANY, OF WILMINGTON, DELAWARE, A CORPORATION OF DELAWARE

SEED DISINFECTANT

No Drawing. Original application filed March 18, 1926, Serial No. 95,789. Divided and this application filed May 21, 1927. Serial No. 193,380.

This invention relates to seed disinfectants, and more particularly to preparations of the character described which, because of their colloidal nature, are peculiarly adapted to be effectively applied in liquid form.

This case is a division of my co-pending application, Serial No. 95,789, filed March 18, 1926.

In recent years the trend of the development of seed disinfectants has been in the direction of products which may be applied to the seed in the form of dry dust. There are, however, certain disadvantages inherent in the dry dusting of seeds which arise in part from the necessity of employing mechanical agitation. Mechanical agitation involves special apparatus and, on a large scale operation, a source of power. Also, in the case of certain seeds, considerable damage is caused by the agitation. Heretofore attempts to obviate this disadvantage by applying the disinfectant in liquid form have not proven satisfactory. Only soluble materials could be so applied and the cost and inconvenience involved in applying a sufficient quantity of such a solution to be effective rendered the method impractical.

I have now discovered a disinfecting preparation which is especially adapted for efficient application to the seeds in liquid form. The new preparation comprises, in admixture with the active disinfectant material, finely divided material adapted to form in water a homogeneous suspension or colloidal solution of a fairly permanent character. For this purpose I may use either reversible or irreversible colloids. The particles of such a suspension or solution naturally tend to adhere to an object immersed therein. It is, therefore, only necessary to dip the seeds in the water suspension or colloidal solution of the new preparation to thoroughly and instantaneously apply to them a layer of material embodying the disinfectant.

For this purpose either water soluble or insoluble disinfectants may be advantageously applied in this manner. If insoluble, the finely divided disinfectant will be buoyed up when water is added and held uniformly distributed throughout the liquid mass by the colloidal matter. If the disinfectant is soluble in the water it follows that a much larger quantity of the solution will be held on the dipped seed by the adhering colloidal matter than would remain on a seed dipped in an ordinary solution of the disinfectant. The suspension may also be applied by sprinkling or in any other well known manner so long as the seed is thoroughly wetted.

As examples of finely divided materials which lend themselves to the preparation of a product of such physical composition that a homogeneous and relatively permanent suspension is formed in water, I may mention potter's clay, kaolin, bentonite, gelatin, glue, casein and agar-agar. It will be obvious that other finely divided materials adapted to form a colloidal suspension or solution in water may be employed.

I have used the term "hydrophylic colloidal material" in this application to indicate a finely divided solid material which has the property of forming, with water, a relatively permanent and substantially homogeneous suspension.

In addition to the disinfectant and colloid I may also employ an inert, non-colloidal material as a mechanical diluent to add to the covering power of the active constituent. Fuller's earth, diatomaceous earth, hydrated lime, calcium carbonate, dolomite and calcium sulphate are examples of such a material. These inert materials may be of such nature that upon drying a relatively hard coating not easily removed by friction will be formed.

The active disinfectant material is also of course, susceptible of variation. I have found, besides the organic mercury compounds, that the inorganic mercury compounds are particularly adapted for my purpose. Especially suitable are the chlorides of mercury, and mercury sulfate.

In order to disclose the invention in more detail the following examples of actual embodiments thereof are presented. It is to be understood, of course, that these examples are furnished for illustrative purposes solely, and that it is not my intention to be limited to the proportions or ingredients therein set forth.

Examples

1

| | Per cent |
|---|---|
| Mercury chloride (a soluble salt) | 6 |
| Bentonite | 94 |

2

| | |
|---|---|
| Mercury sulfate (an inorganic mercury salt) | 10 |
| Bentonite | 90 |

3

| | |
|---|---|
| Mercury chloride | 12 |
| Lime | 7 |
| Sodium carbonate | 5 |
| Bentonite | 70 |

In this latter example, the insoluble mercury oxide is formed in the presence of the lime and bentonite. In all of these mixtures other materials than those specified may be added, such for example, as calcium sulfate, to replace a part of the bentonite. The calcium sulfate assists in producing a more permanent coat on the surface of the seeds.

In any one of these examples I may also use more than one mercury salt, and this is sometimes desirable. Furthermore, I may use a mercury salt together with an organic mercury compound in the same preparation.

The described compounds and method of applying the disinfectant which constitute my invention are productive of distinct commercial advantages. The elimination of the necessity for either a long soaking period or equipment for maintaining uniform high temperatures greatly attracts anyone who is familiar with the practical problem of potato seed treatment. All of the material can be used and the inevitable losses incidental to applying finely divided powder in dry form are eliminated. Since no agitation is required, injury to seeds, such as potatoes, is thus avoided and a source of power is not necessary. The fact that inert materials can be combined in the product to insure upon drying a hard coating that will not rub off in the subsequent handling is also important. Also, cut potatoes while still wet from cutting can be immediately treated and a uniform coating obtained. Dry dusting is practically impossible under these conditions.

As many apparently widely different embodiments of this invention may be made without departing from the spirit thereof, it is to be understood that I do not intend to limit myself to the specific embodiments thereof except as indicated in the appended claims.

I claim:—

1. A seed disinfecting preparation which comprises an inorganic mercury compound and a hydrophylic colloidal material, adapted to form with water a relatively permanent and substantially homogeneous suspension.

2. A seed disinfecting preparation which comprises a mercury salt and a hydrophylic colloidal material, adapted to form with water a relatively permanent and substantially homogeneous suspension.

3. A seed disinfecting preparation which comprises a soluble mercury salt and a hydrophylic colloidal material, adapted to form with water a relatively permanent and substantially homogeneous suspension.

4. A seed disinfecting preparation which comprises in admixture an inorganic mercury compound and bentonite, said preparation adapted to form with water a relatively permanent and substantially homogeneous suspension.

5. A seed disinfecting preparation which comprises in admixture a mercury salt and bentonite, said preparation adapted to form with water a relatively permanent and substantially homogeneous suspension.

6. A seed disinfecting preparation which comprises in admixture a soluble mercury salt and bentonite, said preparation adapted to form with water a relatively permanent and substantially homogeneous suspension.

7. A seed disinfecting preparation which comprises in admixture a finely divided inorganic mercury compound and a finely divided material, said preparation adapted to form with water a relatively permanent and substantially homogeneous suspension.

8. A seed disinfecting preparation which comprises in admixture a mercury salt and a finely divided material, said preparation adapted to form with water a relatively permanent and substantially homogeneous suspension.

9. A seed disinfecting preparation which comprises in admixture a soluble mercury salt and a finely divided material, said preparation adapted to form with water a relatively permanent and substantially homogeneous suspension.

10. A seed disinfecting preparation which comprises in admixture a mercuric chloride and a finely divided material, said preparation adapted to form with water a relatively permanent and substantially homogeneous suspension.

11. A seed disinfecting preparation which comprises an inorganic mercury compound, a hydrophylic colloid, an inert non-colloidal substance, all in finely divided form, and water.

12. A seed disinfecting preparation which comprises in admixture an inorganic mercury compound in an aqueous suspension with a colloidal material.

13. A seed disinfecting preparation which comprises an inorganic mercury compound in an aqueous suspension of bentonite.

In testimony whereof I affix my signature.

FOREST J. FUNK.